July 14, 1970  K. M. TAYLOR  3,520,667
SILICON CARBIDE COATED DIAMOND ABRASIVE GRAINS
Filed Aug. 15, 1967
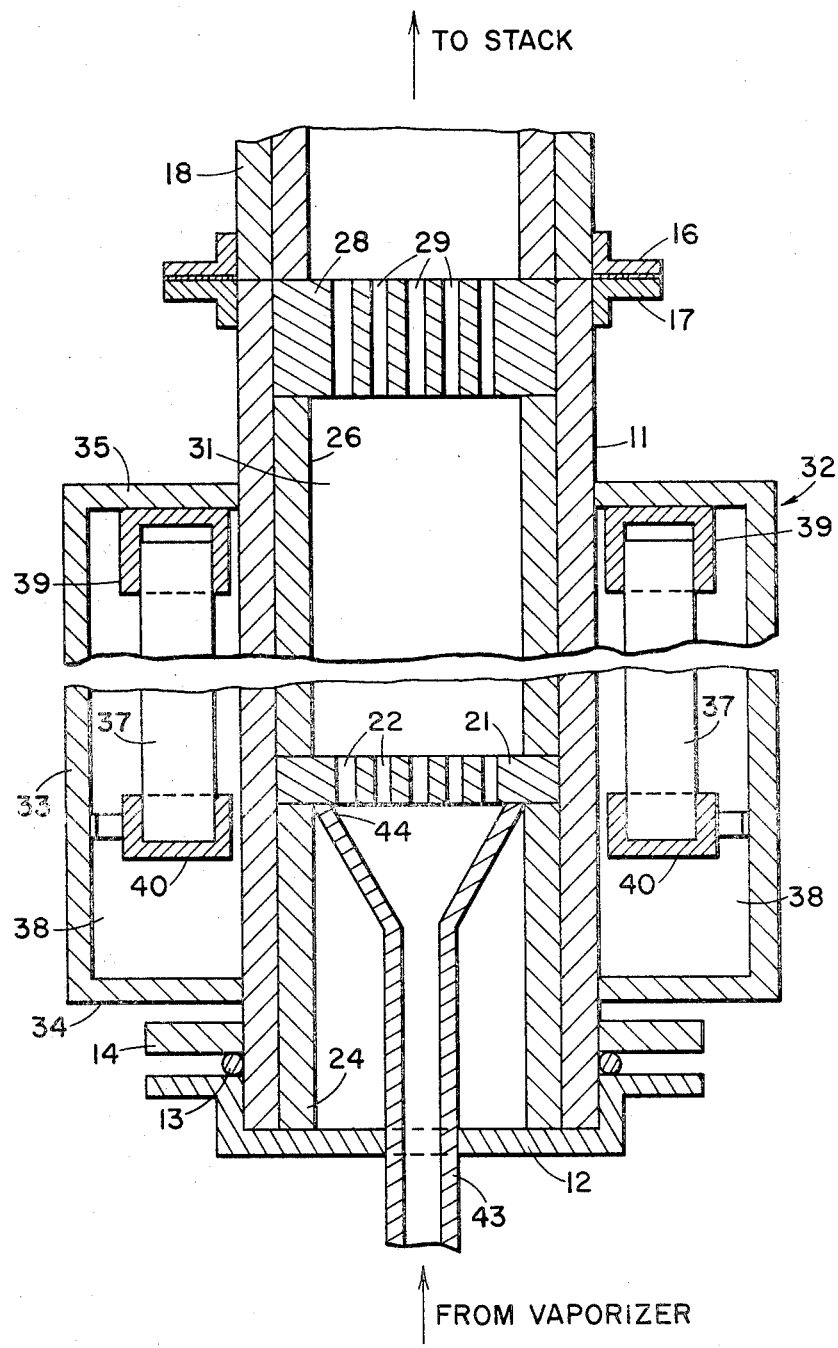
INVENTOR.
KENNETH M. TAYLOR
BY
K.W. Brownell United States Patent Office 3,520,667
Patented July 14, 1970

3,520,667
SILICON CARBIDE COATED DIAMOND
ABRASIVE GRAINS
Kenneth M. Taylor, Maitland, Fla., assignor to The
Carborundum Company, Niagara Falls, N.Y., a
corporation of Delaware
Filed Aug. 15, 1967, Ser. No. 660,670
Int. Cl. B24d 17/00
U.S. Cl. 51—295      14 Claims

ABSTRACT OF THE DISCLOSURE

An adherent surface coating of silicon carbide is provided on diamond abrasive particles by suspending the particles in a gaseous atmosphere comprising a volatile silicon compound such as methyltrichlorosilane and forming, by thermal decomposition of the silicon compound, a silicon carbide layer on the particles.

BACKGROUND OF THE INVENTION

The invention of this application relates to diamond abrasive grain, the particles of which have an adherent layer of silicon carbide on the surfaces thereof, to a process for producing such coated abrasive grain, and to abrasive wheels formed from such coated abrasive grain.

In bonding diamond abrasive particles there is often a problem involved in obtaining proper adhesion of the bonding material to the particles. Diamond is, of course, a quite pure form of carbon and has a dense, hard structure which the resinoid, metal and ceramic materials usually employed as bonds in the manufacture of abrasive articles often do not wet during the manufacturing process. Consequently, the grinding efficiency of the resultant articles is low because the diamond particles are easily pulled out of the surface of the abrasive article and do not contribute their full value to stock removal. As diamond is an expensive abrasive material, the loss of efficiency is frequently quite important. Some efforts have previously been made to increase the adherence of bonding agents to diamond abrasive. An example is seen in Kurtz U.S. Pat. No. 2,319,331. However, previous methods which involve treating the surfaces of the diamond particles at high temperatures often involve undesirable attack of the diamond by the treating material or by oxygen.

SUMMARY OF THE INVENTION

Diamond abrasive particles are given a surface coating of silicon carbide by suspending the particles in a gaseous atmosphere comprising a volatile silicon compound and subjecting the suspension to an elevated temperature at which the silicon compound is decomposed and forms the coating. Although alternative procedures may be used, it is preferred to form a fluidized bed with the diamond particles being suspended in a mixture of gases which includes hydrogen and the volatilized silicon compound. The bed is heated to cause decomposition of the silicon compound and formation of the silicon carbide coating on the dispersed and suspended diamond particles.

In forming silicon carbide coatings on the diamond particles one may use as the volatile silicon compound methyltrichlorosilane. At the temperatures to which the fluidized bed of diamond particles is heated, i.e., about 1300° C.–1500° C., the methyltrichlorosilane undergoes thermal decomposition and silicon carbide, which deposits on the particles, is formed by reaction of the silicon and carbon present in the silicon compound. Other chlorosilanes may be used instead of methyltrichlorosilane, as may other volatile compounds which yield, at the temperatures employed, reactive silicon and carbon compounds. When the volatile silicon compound used is one such as silicon tetrachloride which contains no carbon, hydrogen is used as well as a gaseous source of carbon such as methane, ethane or other carbonaceous gas. Thus, upon thermal decomposition of the silicon tetrachloride the necessary materials for the reaction are present.

The coated diamond abrasive particles may be formed into abrasive articles by conventional procedure using any known bonding materials for such purposes.

DESCRIPTION OF THE DRAWING

The single figure represents a vertical sectional view, partially diagrammatic, of apparatus suitable for carrying out the coating of abrasive particles in accordance with the present invention. It will be understood, however, that the apparatus forms no part of the present invention.

In the drawing, the numeral 11 designates an elongated tube of suitable refractory material such as mullite or the like. The tube 11 is provided at its lower end with a flanged cap 12, and sealing thereof to the tube is obtained by coaction of the cap with a sealing ring 13 surrounding the tube 11 and with an outwardly projecting flange or collar 14, the assembly being held together by suitable means such as clamps or bolts (not shown). At its upper end the tube 11 is joined by suitable means such as the gasketed flanges 16 and 17 to an exhaust tube or line 18. Adjacent to the lower end of the tube 11 there is provided internally thereof a grid which, as shown, may comprise a transverse disc 21 having a plurality of perforations 22 therethrough. The grid which conveniently may be formed of graphite, although other refractory materials may be used, is supported within the tube 11 by the internal, annular, retaining ring 24 which makes contact with an annular portion of the bottom surface of the disc 21 and is held in position in the tube 11 by the cap 12.

The tube 11 above the grid disc 21 is provided with a lining tube 26 which preferably is formed of graphite and has a relatively thin wall thickness to aid heat transfer. There is also provided within the tube 11, at the upper end thereof and adjacent the exhaust line 18, a retaining grid 28 which comprises a transverse disc supported at its edge on the lining tube 26 and having a plurality of perforations 29. The grid 28 is also preferably formed of graphite.

The numeral 32 designates comprehensively a furnace which surrounds the tube 11 from a point intermediate the grid disc 21 and the cap 12 to a point adjacent the retaining grid 28. The furnace 32 may be of any desired construction but conveniently comprises an outer cylindrical wall 33 having an inwardly directed flange 34 at its lower end forming a bottom and an inwardly directed flange 35 at its upper end forming a cover. It will be understood that the configuration of the furnace walls is not critical and that they may, if desired, be sectional for ease in servicing and may embody other conventional details of construction. Also, of course, the walls of the furnace may be and preferably are provided with insulation (not shown). A plurality of annularly spaced electrical heating elements 37 are provided within the chamber 38 formed between the cylindrical wall 33 of the furnace 32 and the tube 11. The elements 37 are held vertically in upper and lower conventionally depicted mountings 39 and 40, respectively, and are provided with suitable electrical contacts, connections, and controls (not shown).

Below the disc 21 is a gas inlet tube 43 which extends upwardly through the cap 12 into the retaining ring 24 with which the tube is concentric. Adjacent its upper end 44 the tube 43 is flared and is secured (by suitable means not shown) with said end in face to face contact with the bottom face of the disc 21. If necessary suitable packing (not shown) may be provided around the tube 43 where it passes through the cap 12.

DESCRIPTION OF THE PREFERRED EMBODIMENT

The production of silicon carbide coated diamond particles is preferably carried out as set forth in the following example.

EXAMPLE 1

Using apparatus of the character described above, diamond particles graded to pass through a 16 mesh sieve and be held on a 20 mesh sieve are introduced into the chamber 31 between the perforated disc 21 and the grid 28 and then suspended in hydrogen introduced through the gas inlet tube 43. The tubes 11 and 26 are then heated by supplying electrical current to the heating elements 37 until the temperature in the chamber 31 is about 1325° C. At this point the hydrogen entering the apparatus is diverted so as to come into contact, before entry, with methyltrichlorosilane ($CH_3SiCl_3$) heated to about 35° C. The $CH_3SiCl_3$ is quite volatile at such temperatures and the vapor mixes with the hydrogen and contacts the diamond particles, there thermally decomposing, whereby to form on the surfaces of the diamond particles strongly adherent coatings of silicon carbide. When a coating of the desired thickness has been obtained the coated particles are cooled in the chamber 31 and removed.

In carrying out the process it is necessary to utilize a rate of gas flow which in effect forms a fluidized bed of the diamond particles, thus keeping the particles suspended and for the most part out of contact with the walls of the chamber 31. As is well-known, the precise rate of flow required to accomplish fluidization is dependent upon many factors including: size of the chamber; amount of granular material; specific gravity, particle size, particle shape, and particle size distribution of the granular material; nature of the gas used; and the configuration of the chamber and the gas distributing means used. Accordingly, it is not feasible to precisely define or specify the gas flow rate or total gas flow necessary or desirable in different apparatus. In the present example, however, with a chamber approximately 560 mm. long and approximately 24 mm. in diameter and a charge of approximately 10 grams of diamond particles of the size specified, a hydrogen flow rate of 9 l./min. was satisfactory. In a run of about 40 minutes 75 ml. of $CH_3SiCl_3$ was passed through the chamber as vapor, this vapor contributing to some extent to suspending the diamond particles.

The presence of hydrogen during the production of the silicon carbide coatings on diamond particles appears to be advantageous, i.e., the formation of a good coating is apparently facilitated thereby. It is not essential, however, as shown by the following example, to use hydrogen as the principal fluidizing gas.

EXAMPLE 2

The procedure followed is essentially the same as in Example 1 except that instead of using only hydrogen as a fluidizing gas for the diamond particles and a carrier gas for the $CH_3SiCl_3$, a mixture of helium and hydrogen is used in a volume ratio of about 14:1. In a run of about 15 minutes a substantial coating of silicon carbide is produced on the diamond particles.

The silicon carbide coatings obtained on the diamond particles by the process of the present invention will, of course, vary in thickness in accordance with the amount of methyltrichlorosilane employed, the efficiency of the process, and the time of treatment. However, examination of many silicon carbide coated particles, including particles with quite thin coatings, has shown the coatings to be hard, nonporous, and crystalline. X-ray examination indicates that the silicon carbide is partially $\alpha$ SiC and partially $\beta$ SiC. Also, as stated above, the coatings are quite even and adherent.

Silicon carbide coated diamond particles may be used to advantage in producing abrasive articles. The coated diamond grit, which may be produced in any size range desired, can be formed into abrasive articles such as wheels, hones, and the like using any desired type of bond for the grit, metal, resinoid, and ceramic type bonds all being well-known and suitable for this purpose. Coated abrasive articles may also be produced by adhesively adhering silicon carbide coated diamond grit to a backing which will usually be a flexible one such as paper or cloth. The silicon carbide coatings permit better bonding to the diamond particles than is often obtainable with uncoated diamond grit and also protect the diamond from oxidation at the temperatures often employed in making abrasive articles with metal or ceramic bonds.

In the following example the use of silicon carbide coated diamond grit in an abrasive wheel is described.

EXAMPLE 3

Segments, each approximately 4.76 cm. x 0.36 cm., were formed by pressing a mixture of copper and tin powders in an 82:18 weight ratio with silicon carbide coated diamond particles. The pressed segments were sintered at 630° C. by conventional procedure and brazed to the periphery of a steel disc to give a cut-off wheel approximately 45.72 cm. x 1.02 cm. x 4.29 cm. The segments contained 6¼ volume percent of diamond. Tests on the cut-off wheel showed that it cut freely and held the diamond grit better than a similar wheel in which uncoated diamond grit was used as the abrasive.

As pointed out above, any other desired bond can be employed in forming abrasive articles with silicon carbide diamond abrasive and it will be understood that filters, secondary abrasives and other additives known and used in the abrasive art can be incorporated in such articles as desired.

I claim:

1. Abrasive grain consisting of diamond particles, each particle having thereon a firmly adherent, hard coating of silicon carbide.

2. Abrasive grain as defined in claim 1 in which said surface coating is nonporous.

3. Abrasive grain as defined in claim 1 in which said surface coating is crystalline.

4. Abrasive grain as defined in claim 3 in which said surface coating includes $\alpha$ SiC and $\beta$ SiC.

5. A process for producing abrasive grain as defined in claim 1 which comprises heating diamond particles to a temperature in the range from about 1300° C. to 1500° C. and contacting said heated particles with a gaseous atmosphere containing a chlorosilane compound.

6. A process as set forth in claim 5 in which said particles are suspended in a fluidized bed during said heating.

7. A process as set forth in claim 6 in which fluidization of said particles is accomplished by flow of a gas selected from the group consisting of hydrogen and an inert gas.

8. A process as set forth in claim 7 in which said gaseous atmosphere contains hydrogen.

9. A process as set forth in claim 5 in which said diamond particles are suspended in a fluidized bed within a chamber by flow of a gas stream while heated to a temperature in the range from about 1300° C. to about 1500° C., said gas stream containing hydrogen and a chlorosilane compound whereby said coating of silicon carbide is produced on said particles.

10. A process as set forth in claim 9 in which said temperature is from about 1300° C. to about 1350° C.

11. A process as set forth in claim 10 in which said chlorosilane is methyltrichlorosilane.

12. An abrasive article comprising a bond selected from the group consisting of metal, resinoid and ceramic bonds, and coated diamond abrasive grain as defined in claim 1.

13. An abrasive article comprising a bond selected from the group consisting of metal, resinoid and ceramic bonds, and coated diamond abrasive grain as defined in claim 2.

14. An abrasive article comprising a bond, selected from the group consisting of metal, resinoid and ceramic bonds, and coated diamond abrasive grain as defined in claim 4.

References Cited

UNITED STATES PATENTS

| | | | |
|---|---|---|---|
| 2,878,111 | 3/1959 | Daniels | 51—298 |
| 3,207,699 | 9/1965 | Harding | 117—100 |
| 3,249,509 | 5/1966 | Blocher | 117—100 |
| 3,276,968 | 10/1966 | Ingleby | 117—100 |

DONALD J. ARNOLD, Primary Examiner

U.S. Cl. X.R.

51—298, 308, 309; 117—100